(12) United States Patent
Vogler et al.

(10) Patent No.: US 10,579,678 B2
(45) Date of Patent: Mar. 3, 2020

(54) DYNAMIC HIERARCHY GENERATION BASED ON GRAPH DATA

(71) Applicant: SAP SE, Walldorf (DE)

(72) Inventors: Hartmut Vogler, San Mateo, CA (US); Torsten Heise, Heidelberg (DE); Kefeng Wang, Wiesloch (DE); Tarek Auel, Mannheim (DE); Lukas Mairon, Muehlhausen (DE); Maiko Mueller, Gaiberg (DE); Sudhir Rao, Freemont, CA (US); Michael Boettcher, Rauenberg (DE); Sven Hader, Wiesloch (DE)

(73) Assignee: SAP SE, Walldorf (DE)

( * ) Notice: Subject to any disclaimer, the term of this patent is extended or adjusted under 35 U.S.C. 154(b) by 265 days.

(21) Appl. No.: 15/207,666

(22) Filed: Jul. 12, 2016

(65) Prior Publication Data

US 2018/0018402 A1 Jan. 18, 2018

(51) Int. Cl.
*G06F 16/901* (2019.01)
*G06F 16/28* (2019.01)
*G06F 16/22* (2019.01)

(52) U.S. Cl.
CPC ...... *G06F 16/9024* (2019.01); *G06F 16/2246* (2019.01); *G06F 16/282* (2019.01)

(58) Field of Classification Search
None
See application file for complete search history.

(56) References Cited

U.S. PATENT DOCUMENTS

| 6,041,053 | A | * | 3/2000 | Douceur | H04L 45/00 370/389 |
| 6,792,456 | B1 | * | 9/2004 | Hellerstein | G06F 11/0709 709/224 |
| 8,700,611 | B2 | * | 4/2014 | Kelshikar | G06F 17/30545 707/722 |
| 2005/0102684 | A1 | * | 5/2005 | McKeon | G06F 9/451 719/328 |
| 2012/0322561 | A1 | * | 12/2012 | Kohlhoff | A63F 13/10 463/42 |

* cited by examiner

*Primary Examiner* — Charles D Adams
(74) *Attorney, Agent, or Firm* — Buckley, Maschoff & Talwalkar LLC

(57) ABSTRACT

Provided are systems and methods for generating a hierarchy. In one example, a method includes receiving a first data graph including a plurality of nodes and links connecting the plurality of nodes, receiving a second data graph including a second plurality of nodes and links connecting the second plurality of nodes, generating a hierarchy based on the first data graph and the second data graph, where the generated hierarchy includes a plurality of levels, nodes from the first data graph arranged on at least one level, nodes from the second data graph arranged on at least one other level, and links connecting the nodes from the first data graph and the nodes from the second data graph, and indicating a relationships between the first and second data items, and outputting the generated hierarchy for at least one of display and further processing.

19 Claims, 18 Drawing Sheets

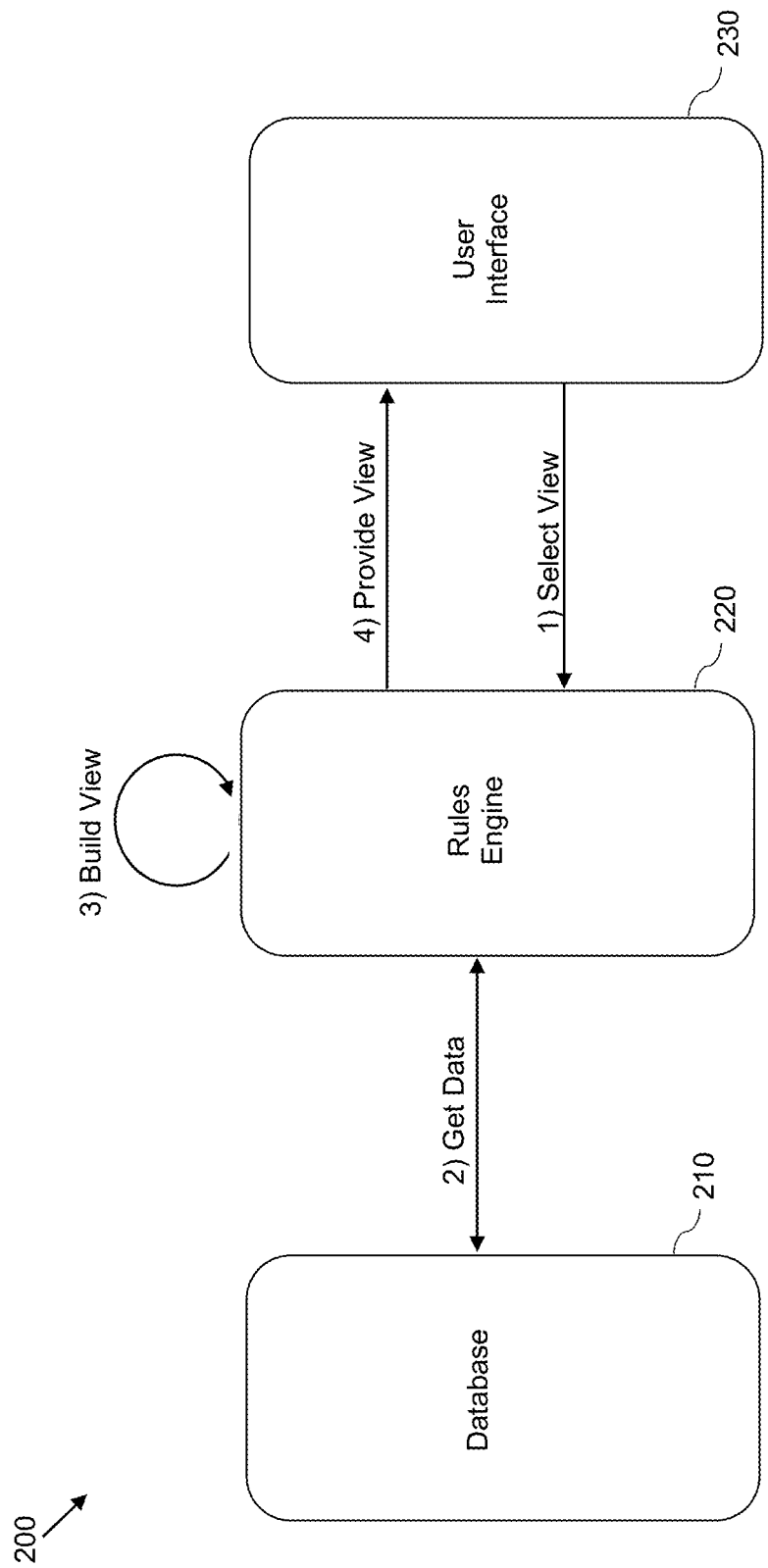

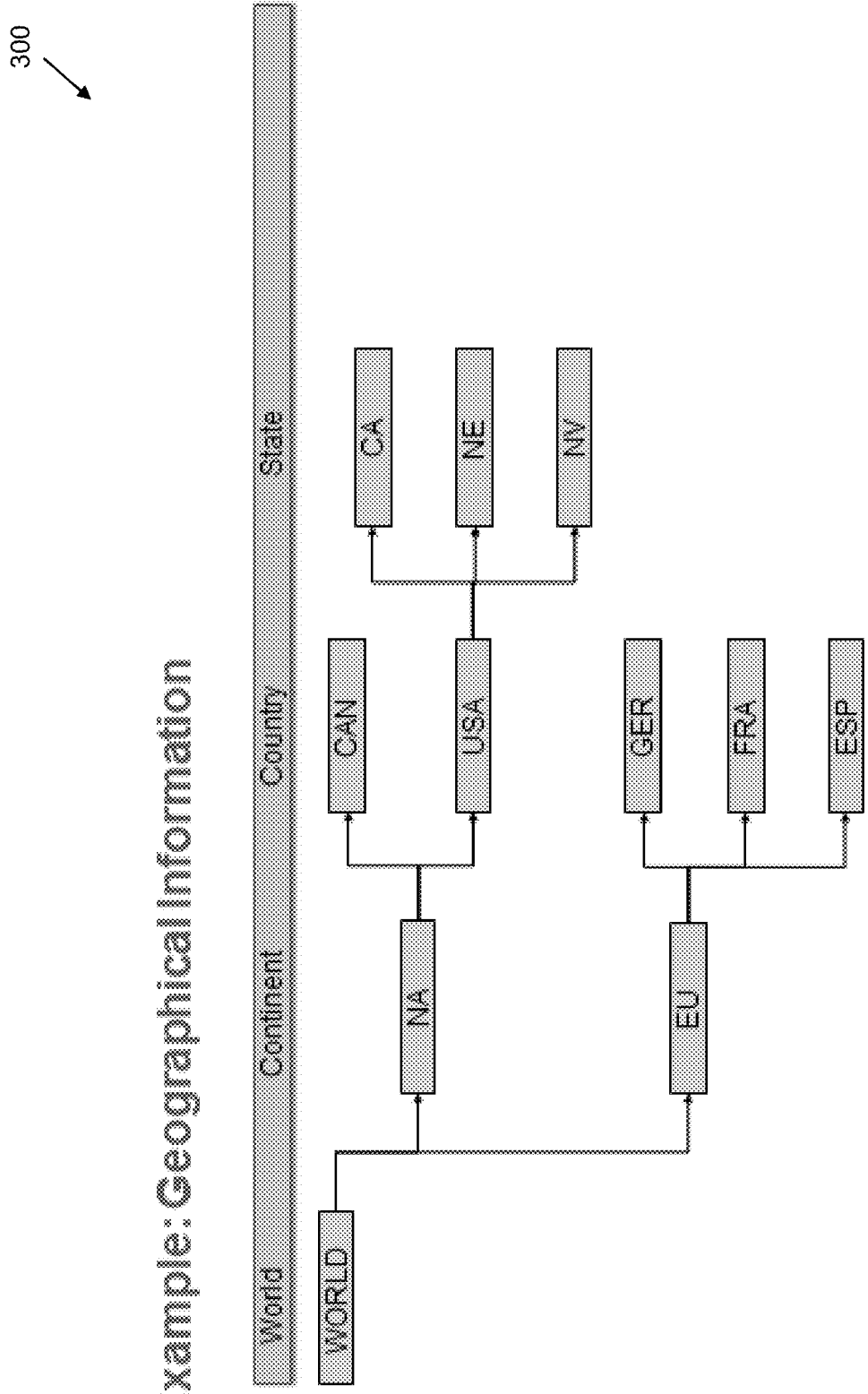

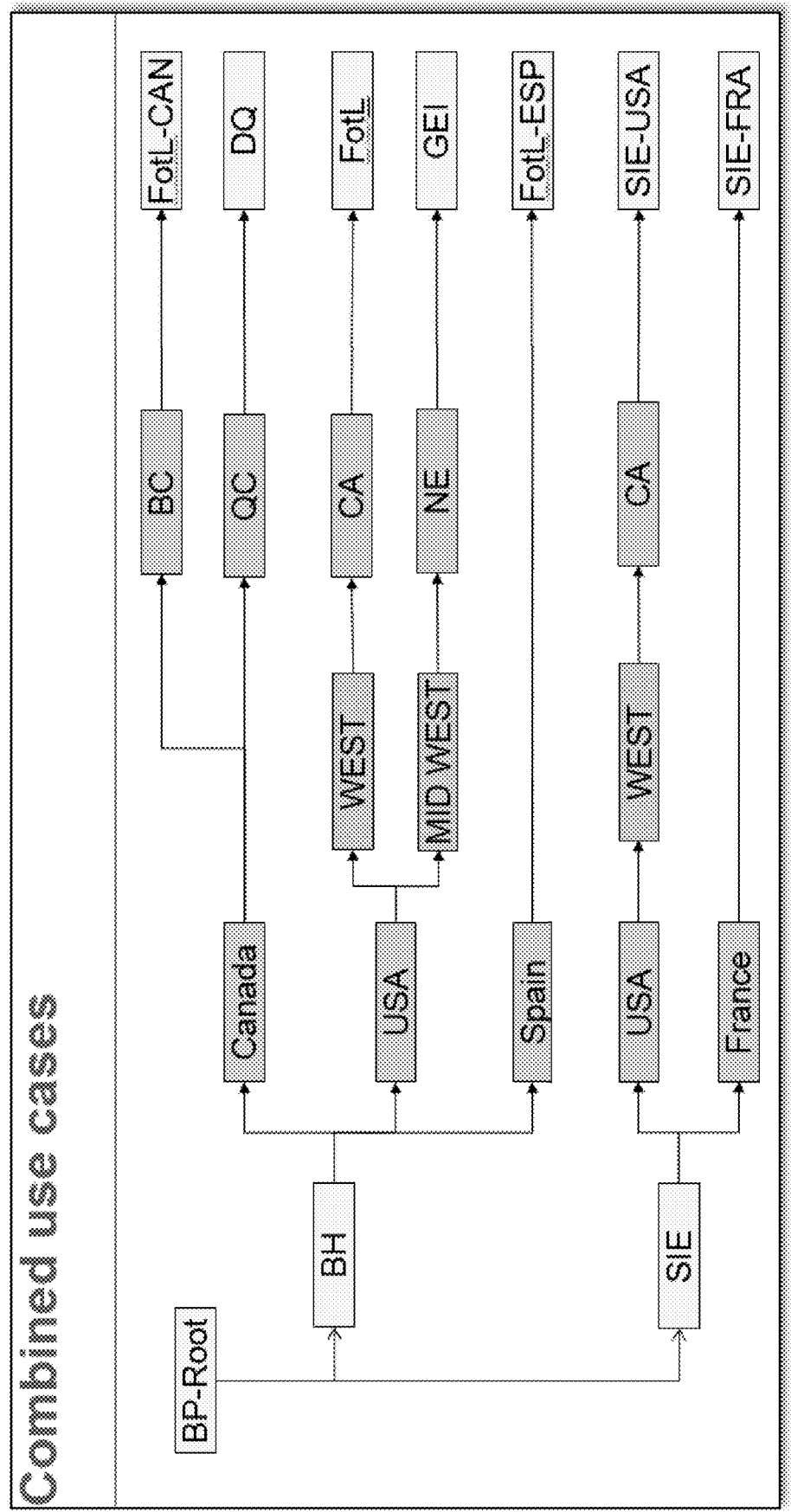

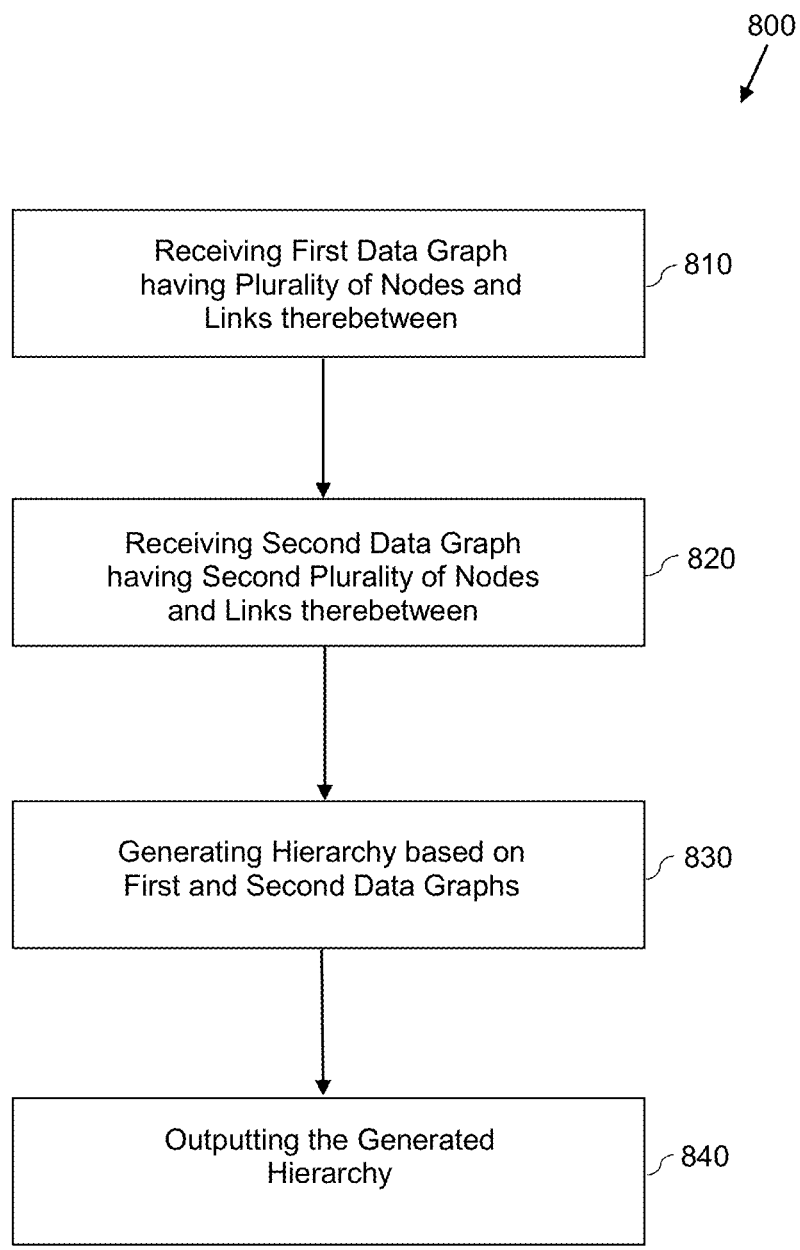

DYNAMIC HIERARCHY GENERATION BASED ON GRAPH DATA

BACKGROUND

Hierarchies are used to visually arrange items (e.g., names, values, objects, etc.) with respect to each other such that items may be represented as being above, below, or on the same level as one another. Within the hierarchy, items may be linked to one another vertically and diagonally. Hierarchies are a common way to classify or sort data for a particular purpose such as for generating analytical reports, understanding geographical relationships, depicting internal organizational structures, and the like. Hierarchies can be useful in many different industries such as finance, business partnerships, costs centers, materials management, and the like. Hierarchies provide the ability to dynamically analyze large volumes of information at various granularity levels enabling a user to drill down further into the information or roll up the information into a more condensed representation. By displaying data in an interactive hierarchical form, a user may perform a detailed analysis or a summarized analysis using the same hierarchy based on a user preference.

Managing how hierarchies are displayed and/or further processed and managing the underlying data can be complicated especially when attempting to combine hierarchies (e.g., a customer hierarchy and a geographical hierarchy) or attempting to generate multiple hierarchies (e.g., different views and/or arrangements) from the same data. For example, a sales department of a company may desire to arrange customer data in the view of a different hierarchy than a marketing department or distribution department of the same company. At present, it is difficult to merge data from multiple hierarchies into the same hierarchy because there is difficulty determining how the data is to be merged. Furthermore, while it may be possible to provide different hierarchical views of the same data, in order to maintain the underlying data requires the storage of a large amount of redundant data. It can also be difficult to keep all of the data up-to-date.

BRIEF DESCRIPTION OF THE DRAWINGS

Features and advantages of the example embodiments, and the manner in which the same are accomplished, will become more readily apparent with reference to the following detailed description taken in conjunction with the accompanying drawings, in which:

FIG. 2 is a diagram illustrating a hierarchy generating system in accordance with an example embodiment.

FIGS. 3A-3D are diagrams illustrating graph data from two graphs being merged into a hierarchy in accordance with example embodiments.

FIG. 5 is a diagram illustrating a hierarchy including a plurality of combined hierarchies in accordance with an example embodiment.

FIG. 8 is a diagram illustrating a method of generating a hierarchy in accordance with example embodiments.

Figure 1:
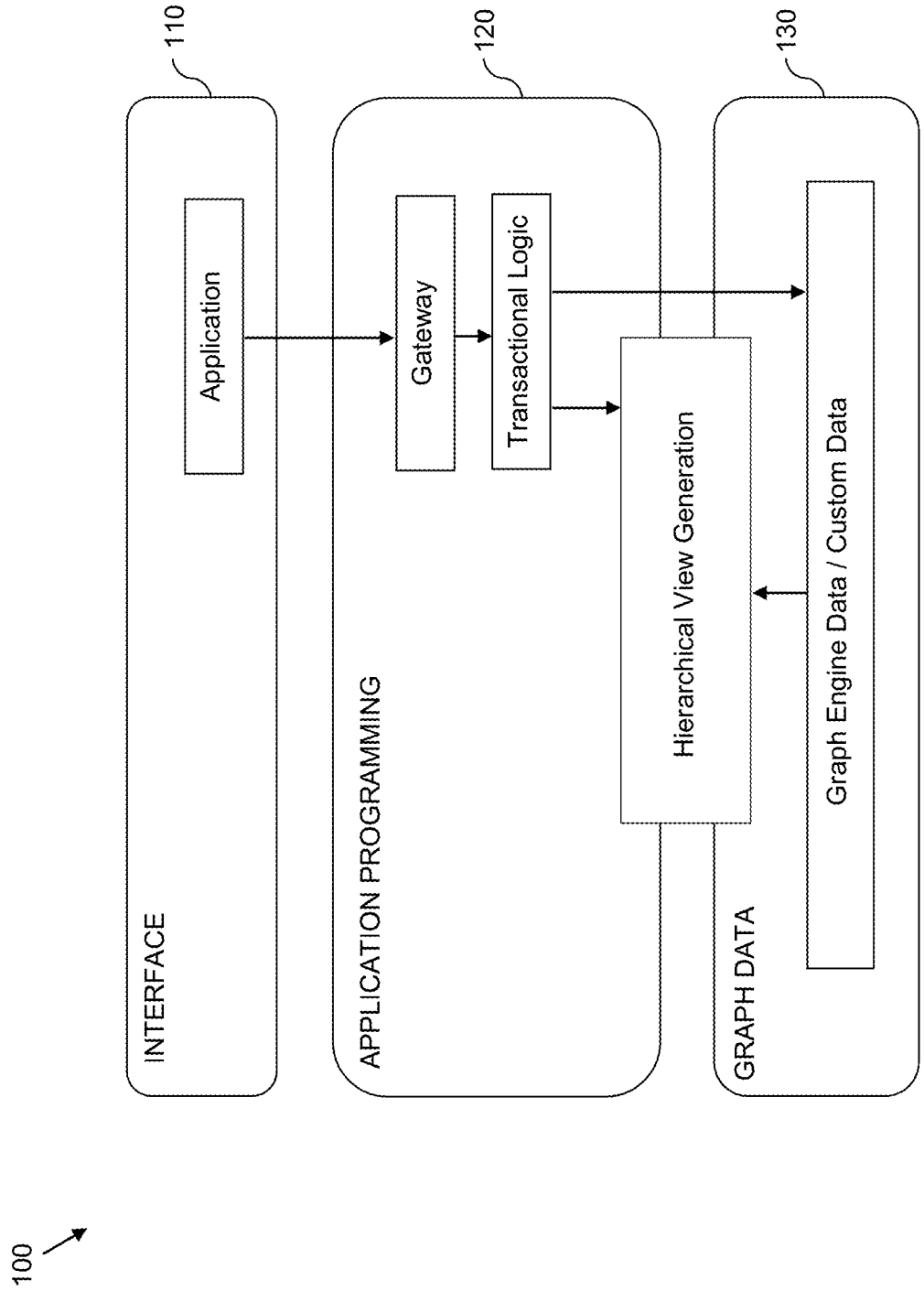
FIG. 1 is a diagram illustrating an architecture of a system for generating analytical hierarchies in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

As will be appreciated, people, organizations, entities, and the like, may desire to see data differently. However, traditional hierarchies only show data in the way it was defined. According to various examples, provided are systems and methods that can dynamically create hierarchies for graph-based data. The system may combine data from multiple graphs to generate a hierarchy. As another example, the system may generate multiple different hierarchies based on the same data. Hierarchies often can be too detailed and complex. Therefore, the example embodiments may rearrange graph data and hide unnecessary graph data.

A data graph may have a format such as a taxonomy, family tree, hierarchy, and the like, and may be stored in a graph database instead of being stored in a relational or columnar database, or it may be stored in a traditional database but have a view in the form of a graph. Links and/or relations between objects in the graph may be established. According to various aspects, multiple data graphs may be combined to generate a hierarchy. For example, customer data from a first graph may be combined with geographic data from a second graph to generate a hierarchy including both customer data and geographic data. It should also be appreciated that the hierarchies may be generated from any kind of arbitrary data, not just specific types of data such as geographic data. That is, in the examples herein geographic data is used for convenience of explanation. As another example, the graph-based data may be used to generate multiple different hierarchies having different views of the same data. In the examples herein, links/relations described in various examples can be established dynamically "on the fly." Furthermore, configuration data may be used to control how the final hierarchy appears when output on a display screen. Based on these rules, statements or functions may be used to extract data for a hierarchy from the graph database, for example, graph queries, SQL statements, graph transformations, and the like. Accordingly, the hierarchy may be created in real-time, without a need to persist the hierarchy. The result is that the hierarchy may be dynamic and provide the possibility of displaying multiple types of hierarchies at the same time for the same data. In some cases, only the relevant information necessary for the hierarchy may be extracted from the graph database and may be discarded after the hierarchy is generated.

Traditional hierarchy management based on relational databases falls short for advanced scenarios in the area of master data management (MDM). Various examples extract information from graph-based data for generating a hierarchy. The examples herein include a graph extraction and manipulation language which offers functions that can navigate through nodes and links of a graph and extract data from the graph. The graph data may be stored as a graph in a graph database or it may be taken from a traditional database and converted or organized such that it can be viewed as a graph. A graph may include two types of entities, vertices (also called nodes) and edges (also called relationships or links). Vertices may store objects and can have attributes while edges may store a connection between two vertices and can have attributes which describe the relationship between two vertices. Also, examples here refer to a first data graph and a second data graph. These terms may refer to but are not meant to be limited to different data graphs. For example, the first data graph may include a first set of data from a graph and the second data graph may include a second set of data from the same graph. In this example, the first set of data and the second set of data may overlap or partially overlap with one another.

Various rules and/or transformations may be defined in order to merge or otherwise combine data from multiple graphs and to create different view and different hierarchies from the same data. The rules and/or transformations may define how a hierarchy is to look. Next, graph data may be extracted for displaying the desired hierarchy. For example, a graph extraction and manipulation (GEM) language may be used to extract data from a graph database or a traditional relational database. The GEM language may use functions, rules, statements, and the like, to extract the graph data. As another example, SQL statements and the like may be used to extract graph data. The extracted graph data may be transformed into a hierarchy and provided to a user interface application for display. As another example, the hierarchy may be provided to an application or other program or device for further processing.

FIG. 1 illustrates an architecture 100 of a system for generating analytical hierarchies in accordance with an example embodiment. The system may include one or more computing devices, for example, at least one database and at least one application ("instance") accessing data and programs from the database. As an example, the system may include a server such as a web application server or a plurality of servers storing the at least one database. The system may also include a user device such as a computer, mobile device, appliance, kiosk, and the like, accessing the servers through a network such as the Internet. The user device may have an application or other program stored therein for generating a hierarchy from graph data. As another example, the application may be stored on a server and may be accessed by the user device through the network.

Referring to FIG. 1, the architecture 100 includes an interface layer 110, an application programming layer 120, and a graph data layer 130. These layers (110, 120, and 130) may run on the same machine or on different physical machines as previously mentioned. As a high-level overview, the graph data layer 130 may include relational databases, graph databases, database software, and the like, where data may be viewed in the format of a graph having nodes and links between the nodes. For example, the nodes may represent data items such as people, places, things, and the like, and the links may represent a relationship between the data items. The application programming layer 120 may include an instance of the system. Application processes for extracting data from the graphs and for generating hierarchies may run on the application programming layer 120. The programs included in the application programming layer 120 may transform graph data from the graph data layer 130 into a hierarchy. The interface layer 110 may handle the interaction with users of the system. For example, online access to application servers may be through a graphical user interface (GUI), web browser, and the like, operating in the interface layer 110.

Applications included in the interface layer 110 may be used to request and view an analytical hierarchy. For example, an application included therein may be used to generate, change, delete, and/or display an analytical hierarchy. In addition, the application may generate the hierarchy visualization (execute an analytical hierarchy) using, for example, one or more libraries, and the like. By executing the hierarchy, an intuitive visualization of the content included in the hierarchy may be generated within the user interface and displayed on a screen of a computing device. The graph data layer 130 may include graph-based data that is capable of being viewed in the form of a graph. The graph data layer 130 may include one or more tables, maps, or other storage data for creating hierarchical views. For example, the database tables may have stored therein graph data including information about nodes and edges connected to one another through links.

Write access to the graph data tables may be supported via an interface that can be accessed for example by a corresponding graph data import tool. An application in the user interface layer 110 may have full access, read only access, or the like, to database tables via a corresponding interface. In addition, a data load application programming interface (API) may be provided to support creation, change, and deletion operations on the graph data. In some examples, a graph engine may be used as a storage (and access) tool for the graph data. The graph data layer 130 may also include graph metadata, transformation metadata, chart metadata (customizing tables), and the like. The metadata may be used to define graphs, rules, available chart types, and the like. The database layer 130 may also include hierarchy data which may be used to define how graphs, rules, and chart types are used to build an analytical hierarchy.

The application programming layer 120 may define the logic and technical aspects of an analytical hierarchy. A configuration of an analytical hierarchy may be generated in the application programming layer 120 based on configuration information such as graph metadata, chart types, attributes of the nodes and links, and the like. As an example, the configuration information may have information about graphs, node types, graph node types, attributes, node type attributes, link types, link type attributes, edge node types, and the like. As another example, the configuration of an analytical hierarchy may be defined by transformation metadata including information for converting graph data to hierarchy data, hierarchy levels, level conditions, chart types, and the like. An analytical hierarchy API may provide access to or a gateway to the interface layer 110 to read hierarchy configuration information and create, change, delete, etc. an analytical hierarchy via an application. A data load API may load graph data from the graph data layer 130. For example, the data load API may load nodes and links, delete nodes and links, and the like, and provide an interface with a set of methods to upload and download data from a graph. As another example, the data load API may select node and link types, and attributes, allow deletion of already existing graph data, and automatically generate links which are stored in the graph database and which can be accessed much faster than virtual links may be calculated. In some cases, link generation may depend on the order of the upload of nodes, for example, if links between different graphs are generated.

FIG. 2 illustrates a hierarchy generating system 200 in accordance with an example embodiment. Referring to FIG. 2, the hierarchy generating system 200 includes a database 210, a rules engine 220, and a user interface 230. According to various aspects, the database 210, the rules engine 220, and the user interface 230 may be included on the same device, or may be included over multiple devices. For example, the database 210 may be stored on one or more servers, the user interface 230 may be an application installed on a user device, and the rules engine 220 may be stored, executed, and/or processed by at least one of the server and the user device. In this example, the user interface 210 may request a hierarchical view to be generated by the rules engine 220 based on data stored in the database 210. In response, the rules engine 220 may determine how the hierarchy is to be generated based on configuration data stored in the database 210. The configuration data may be transformation data for transforming graph data into a hierarchy. For example, the database 210 may store hierarchy configuration information including tables, fields, datasets, spreadsheets, and the like. Based on the hierarchy configuration information, the rules engine 220 may extract data for the hierarchy to be generated from the database 210. The rules engine 220 may build the hierarchy based on the configuration information and the extracted data both of which may be received from the database 210. Accordingly, the rules engine 220 may provide the generated hierarchy to the user interface 230 for viewing by a user.

According to various aspects, data may be stored in the database 210 in the form of graphs and may be extracted from the database 210 to generate hierarchies. Independent of the total size of a dataset, graph data excels at managing connected data and complex queries. With a pattern and a set of starting points, the neighboring data around the starting points on the graph may be analyzed. Graph data typically has two entities, nodes (also referred to as points or vertices) and links (also referred to as relationships or edges). Nodes correspond to objects and have various attributes while links represent connections between two nodes. Links can also have attributes and may be used to describe the relationship between two nodes. Graph data has a significant advantage over data stored in relational databases in that accessing a node can be done instantly and does not depend on other entities. In contrast, accessing connected data in a relational database is performed with a JOIN operator which can increase time exponentially because each access relies on accessing other entities.

In this example, the database 210 may store graph data such as data tables defining nodes, links, and attributes thereof. The database 210 may also store metadata such as graph metadata, transformation metadata, chart metadata, and the like, which may be used to define graphs, rules, available chart types, and the like. The database 210 may also store hierarchy data such as configuration tables that define graphs, rules, chart types, and the like for building hierarchies for specific types of data. The configuration tables may be defined and customized in advance based on particular hierarchical views that are to be generated. The configuration tables may define how to combine two or more different graphs of data into a single hierarchy. As another example, the configuration tables may define two or more hierarchies to generate based on the same data.

Figure 3B:
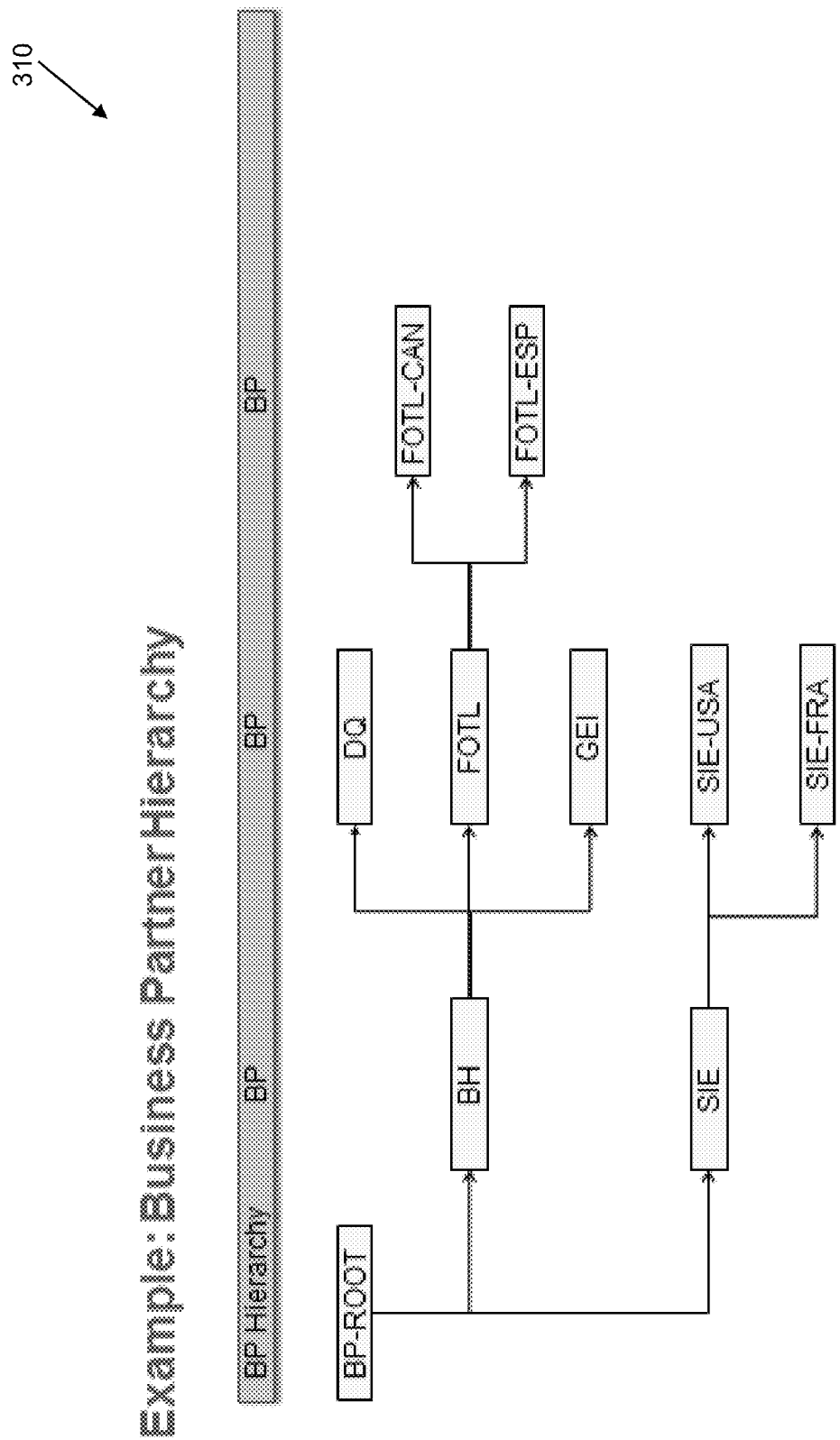

FIGS. 3A-3D illustrate data from two graphs being merged into a hierarchy in accordance with example embodiments. Referring to the examples of FIGS. 3A-3D, the geographic data graph 300 shown in FIG. 3A is merged with the business partner data graph 310 shown in FIG. 3B to generate a hierarchy 320 shown in FIG. 3C, and as another example, to generate the hierarchy 330 shown in FIG. 3D. FIG. 3A illustrates graph 300 having geographical information and FIG. 3B illustrates graph 310 having business partner information. In these examples, both graphs are in the form of a hierarchy to begin with, but the exemplary embodiments are not limited thereto. In FIG. 3A, the geography graph 300 includes the world as a root node, followed by continent nodes, country nodes, and state nodes. In FIG. 3B, the business partner graph 310 includes a root node for business partner, followed by the conglomerate nodes (representing a first company, Berkshire Hathaway, and representing a second company Siemens), subsidiary nodes of the first company and the second company (Fruit of the Loom, Dairy Queen, and Geico), and specific location nodes for the subsidiaries. According to various example embodiments, the system described herein may analyze the graph data from FIG. 3A and FIG. 3B, and determine to merge the graphs in some way to generate the hierarchy 320 shown in FIG. 3C or the hierarchy 330 shown in FIG. 3D. For example, the graph data may be merged based on configuration information determined in advance. For example, the configuration information may be stored in a configuration table. The configuration information may define the graphs, rules, chart types, and the like, for building analytical hierarchies.

Figure 3C:
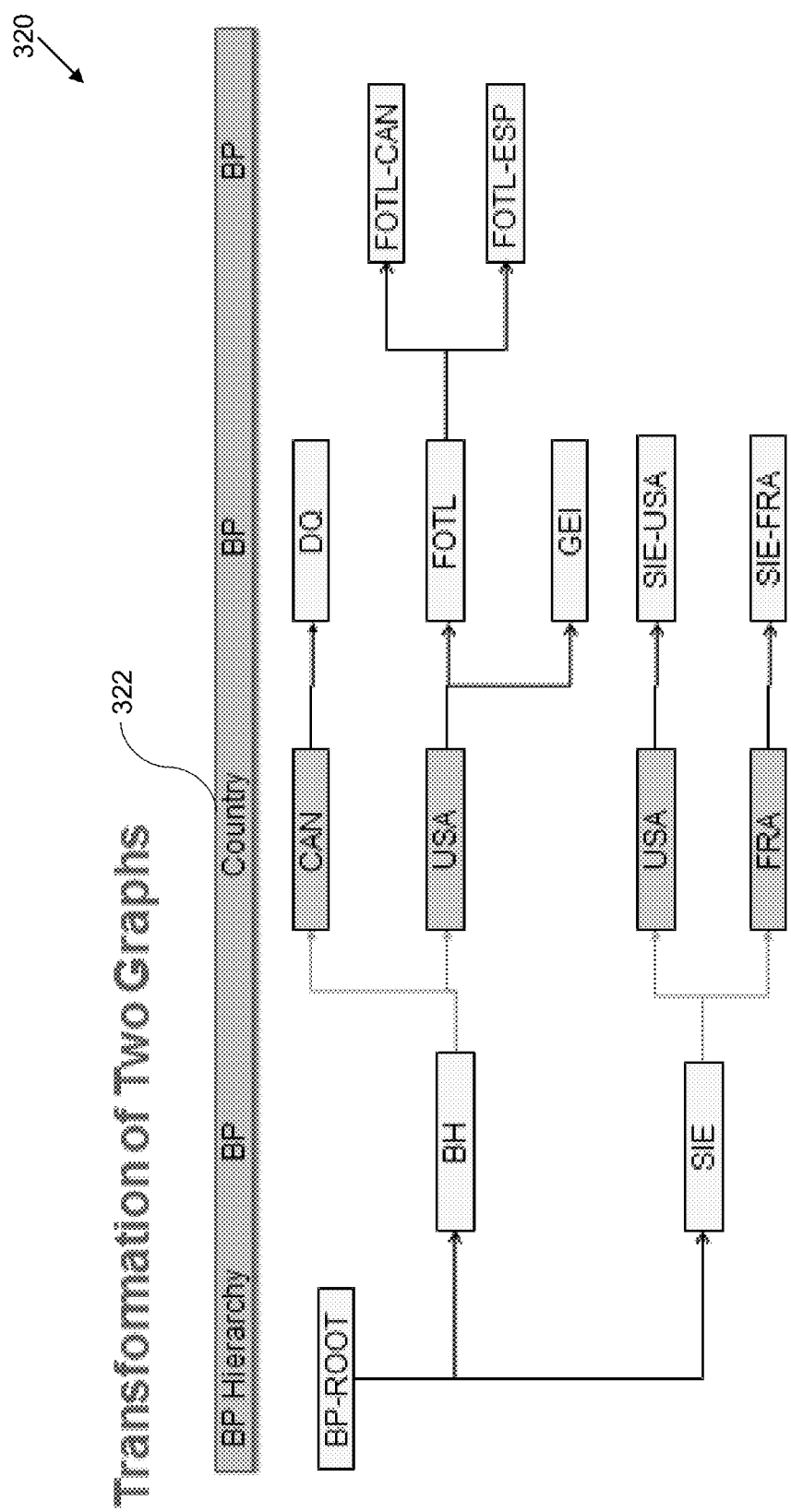
Figure 3D:
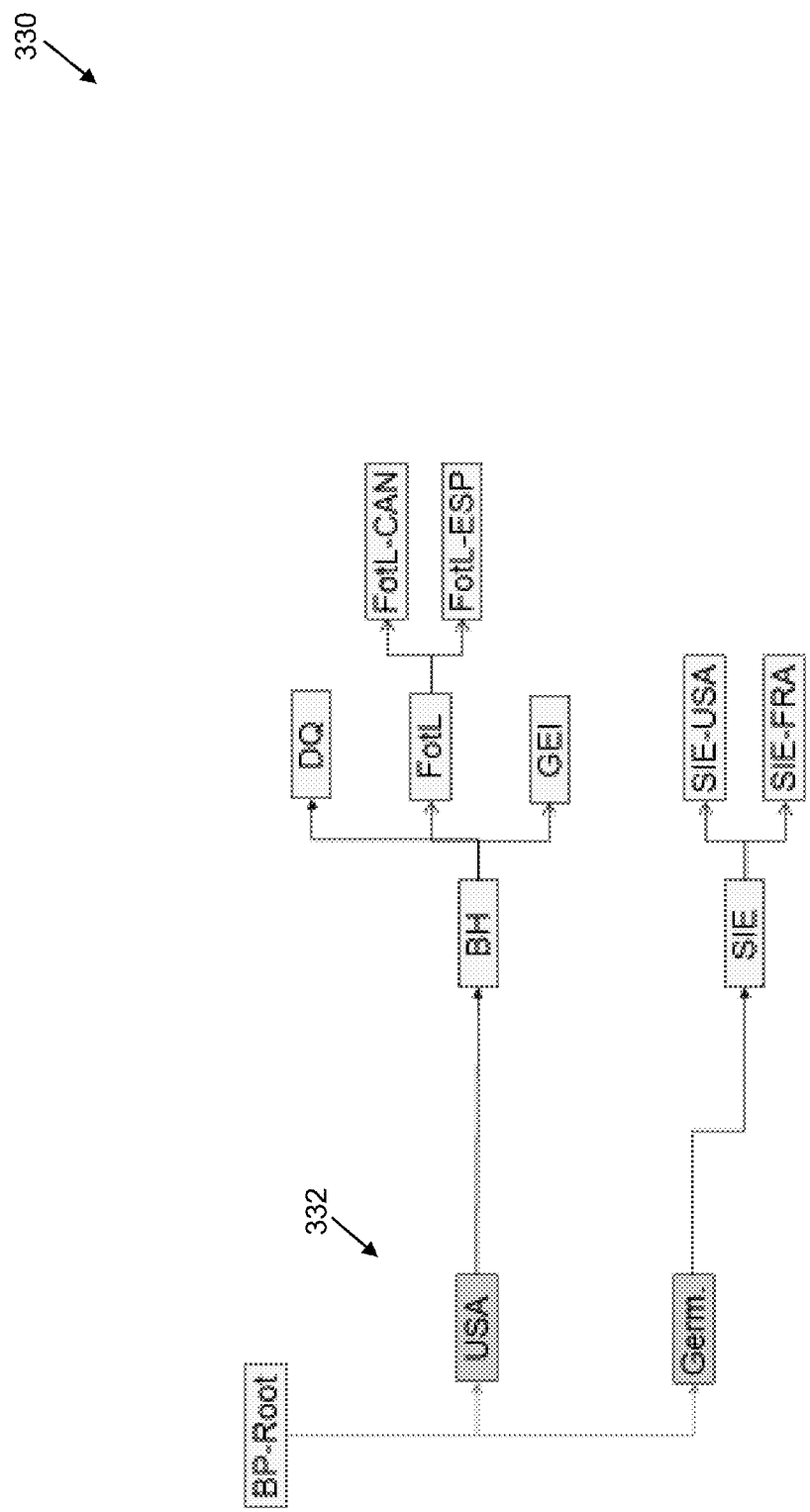

In FIG. 3C, the business partner graph 310 shown in FIG. 3B is modified by the geographic graph 300 shown in FIG. 3A to generate a hierarchy 320 shown in FIG. 3C. In this example, the business partner graph 310 may be referred to as master data because the business partner graph data 310 is being modified by the geographic graph data 300. In FIG. 3C, a country level 322 from geography graph 300 is inserted between the conglomerate level and the subsidiary level of the business partner graph 310. That is, the country level 322 may be based on countries from the geographic graph 300. As another example, in FIG. 3D, country level 332 from geography graph 300 is inserted between the business partner root node level and the conglomerate node level of the business partner graph 310. In this example, the country level 332 may also be based on countries from the geographic graph data 300. A configuration of the hierarchies 320 and 330 may be defined based on configuration information. The configuration information may be selected by a user, automatically selected by the system, and the like. As a non-limiting example, the configuration information may be selected by the user selecting a data type, a node, a node level, a hierarchy format, and the like.

Figure 4A:
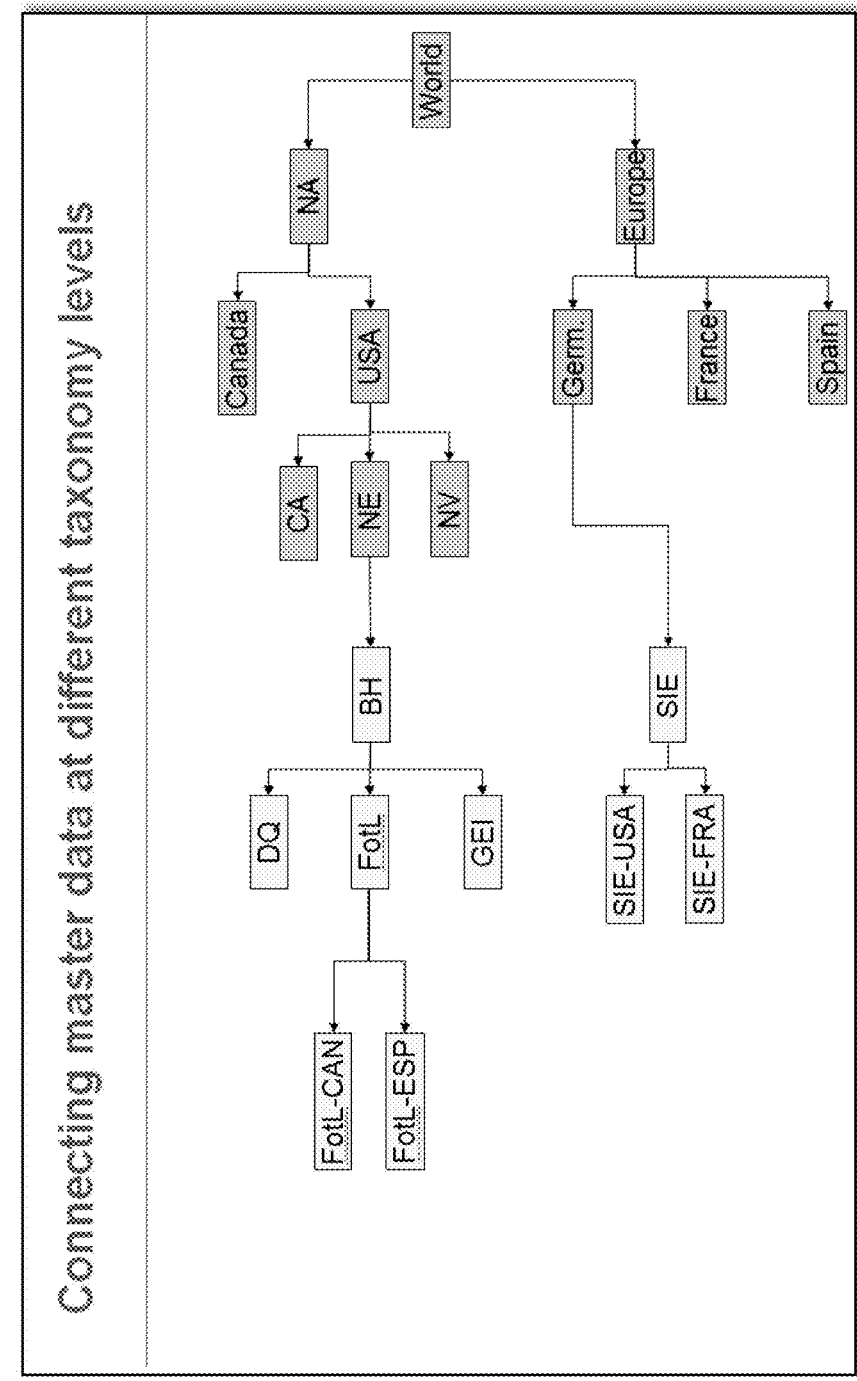
FIGS. 4A-4D are diagrams illustrating other hierarchies that may be generated based on graph data in accordance with various example embodiments.

FIGS. 4A-4D illustrate other hierarchies that may be generated based on graph data in accordance with various example embodiments. Referring to FIG. 4A, master data corresponds to business partner graph data with the two business partners being a first company, Berkshire Hathaway (BH), and a second company, Siemens (SIE). In this example, nodes representing the business partners BH and SIE are included at the same level in the business partner graph but they are connected to differing levels of geographical graph data. In particular, the geographic graph data has four levels represented by world, continent, country, and state. Here, the business partner BH or first company node is connected to the geographical graph data at the state level node in the hierarchy and the business partner SIE node or second company node is connected to the geographical data at the country level node in the hierarchy. That is, nodes from a same level on a first graph data may be connected to nodes at different levels of data on a second graph data.

Figure 4B:
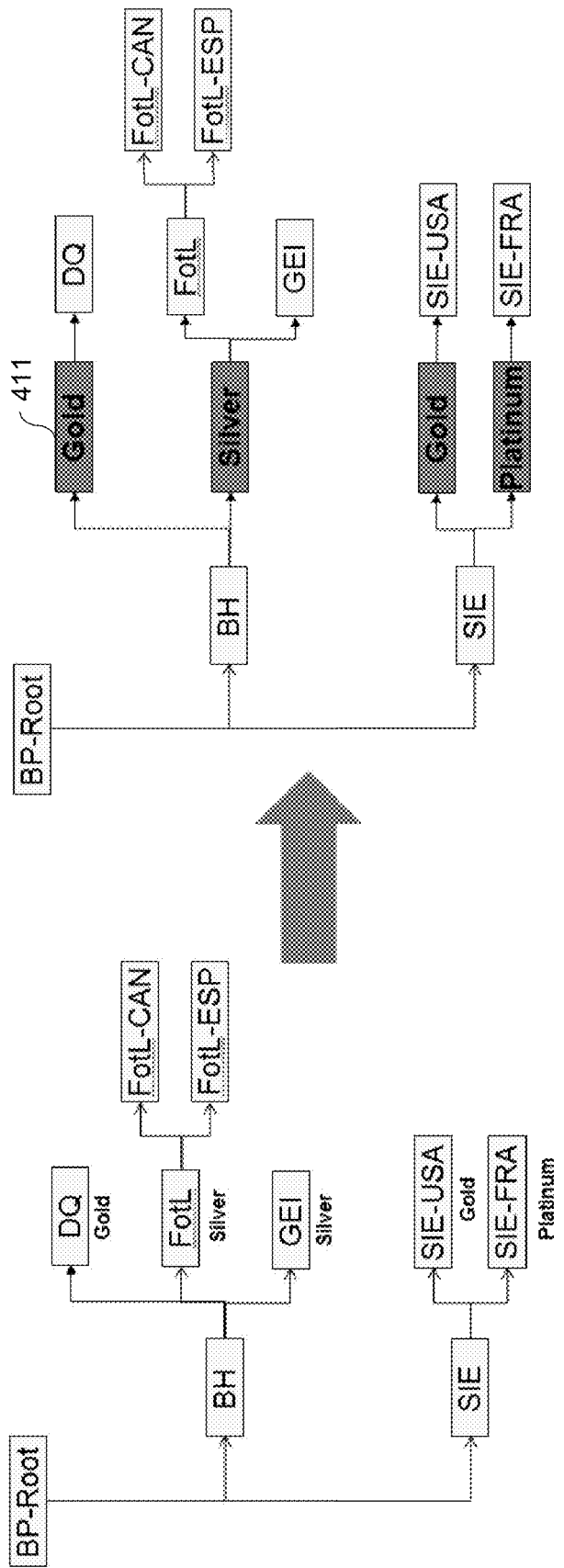
Figure 4C:
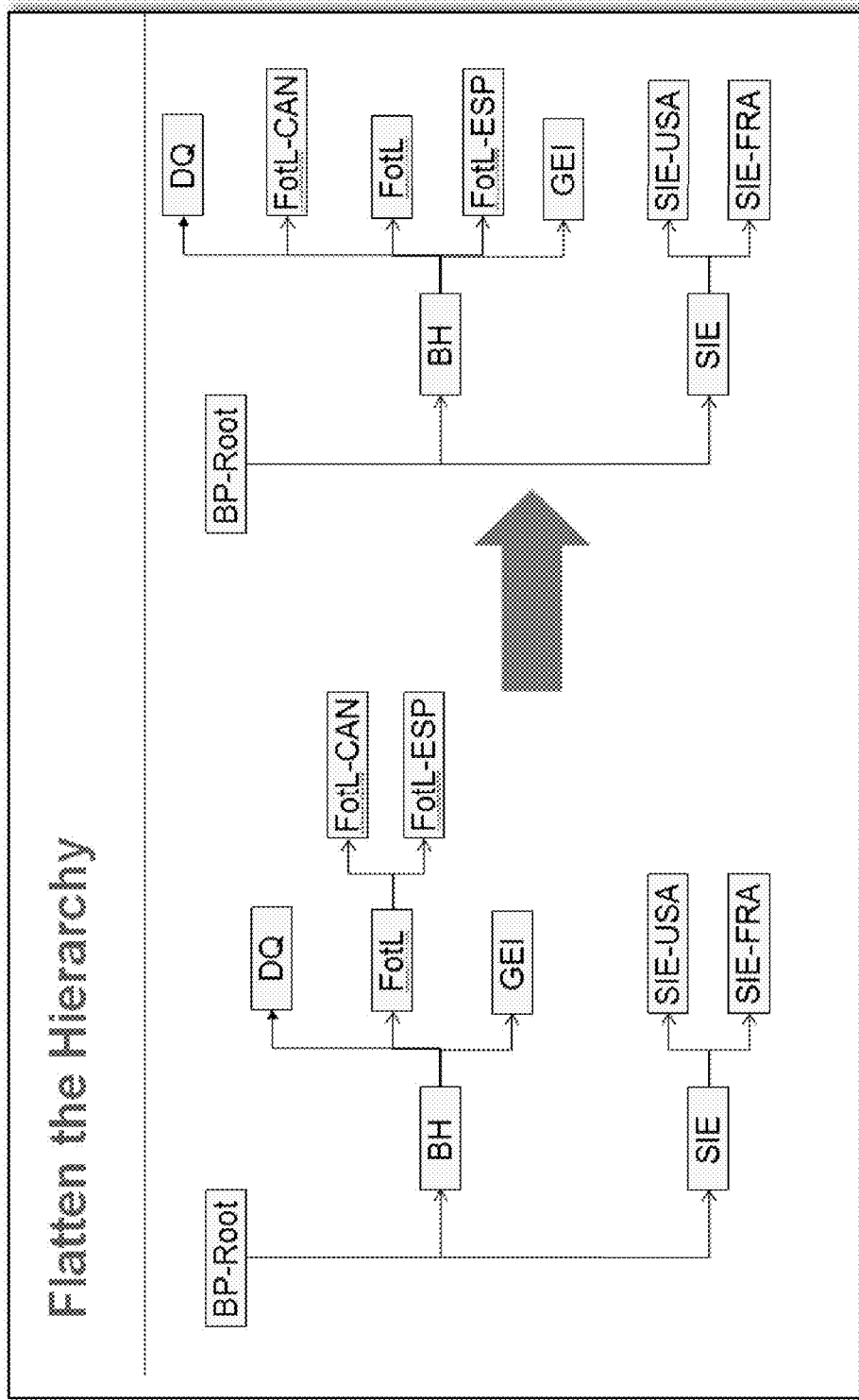
Figure 4D:
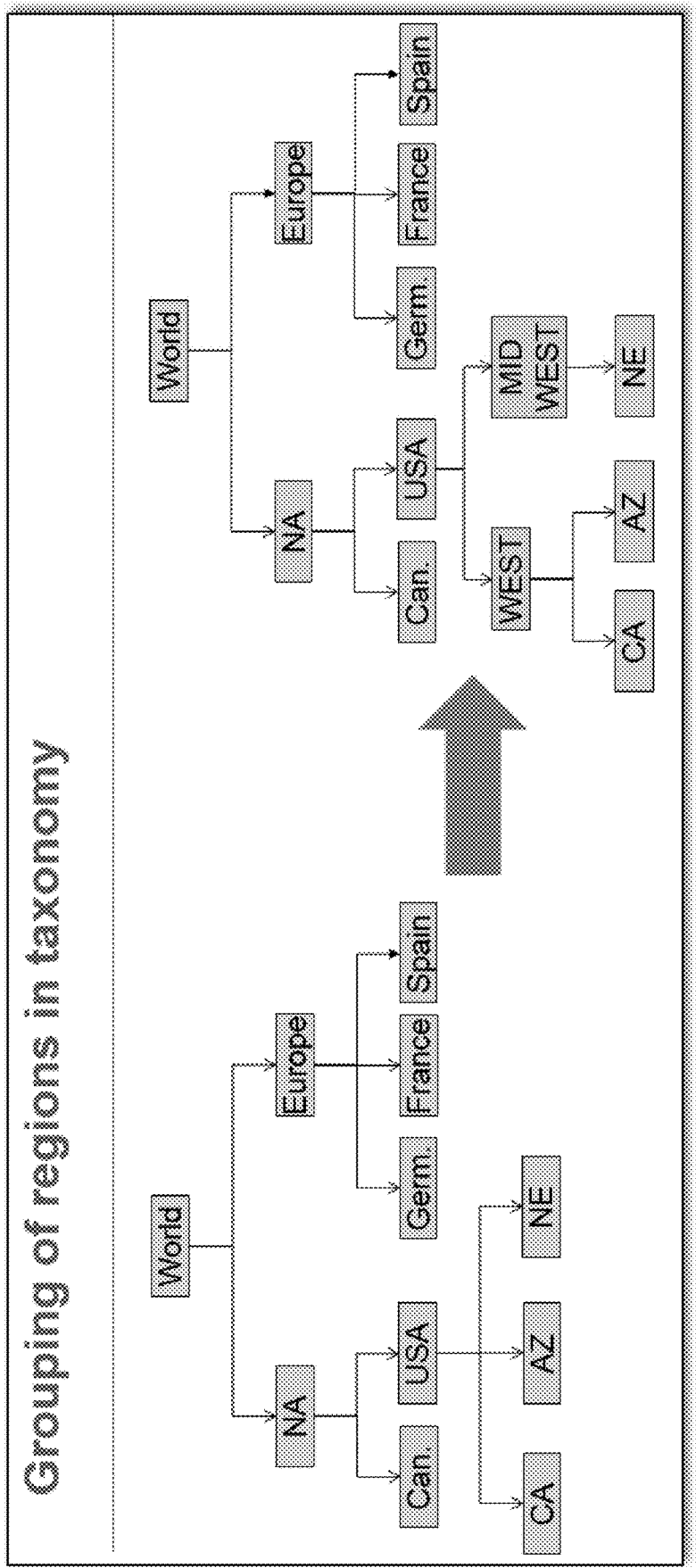

Referring to FIG. 4B, an additional attribute is added in 410 to graph data to generate an additional level of nodes in the hierarchy. Here, the graph data corresponds to business partner graph data having four levels of nodes including a root level, business partner level, subsidiary level, and location level. In this example, subsidiaries are given a ranking from among gold, silver, or platinum. Accordingly, a new level of nodes representing a ranking 411 may be inserted between the business partner level node and the subsidiary level node to generate the hierarchy. For example, the ranking 411 may be based on configuration information that is stored in advance. In the example of FIG. 4C, an example of flattening a hierarchy is provided in 420. In this example, the edge types of the two nodes in the Fruit of the Loom (FotL) subtree, i.e., FotL Canada and FotL Spanish are moved up to the previous level, i.e., FotL. In this example, the configuration information may indicate that the FotL node subtree of FotL Canada node and FotL Spanish node can have two possible conditions in that they may be a separate subtree or that they may be nodes on the same level as the parent FotL node. FIG. 4D illustrates an example of adding regional groupings to geographic graph data in 430. Here, the regions of West and Mid West are added to categorize states in the country USA. As a result, an additional level of nodes is generated in 430 for the regional groups. Furthermore, FIG. 5 illustrates a combination of FIGS. 3A, 4A, 4C, and 4D, in 500. In this example, the graph data from each of the generated hierarchies in FIGS. 3A, 4A, 4C, and 4D are combined with redundancies removed to generate the hierarchy shown in 500 having six levels of nodes. Also, the examples shown in FIGS. 3A-5 use company names, however, it should be appreciated that the examples are not limited thereto, and these names are merely used for convenience as a point of reference in the description.

Figure 6A:
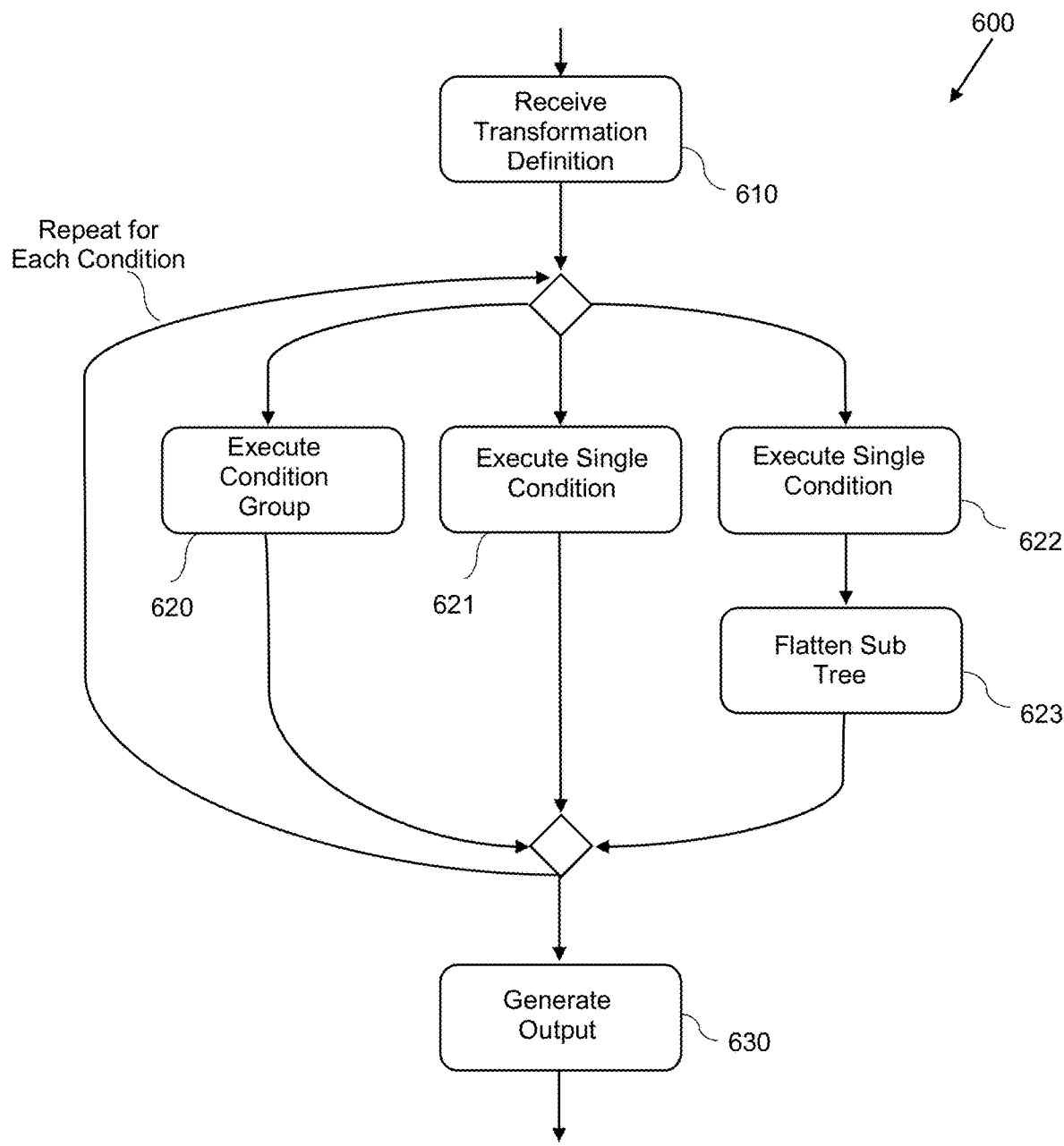
FIGS. 6A-6C are diagrams illustrating a process of generating a hierarchy on a level-by-level basis in accordance with example embodiments.
Figure 6B:
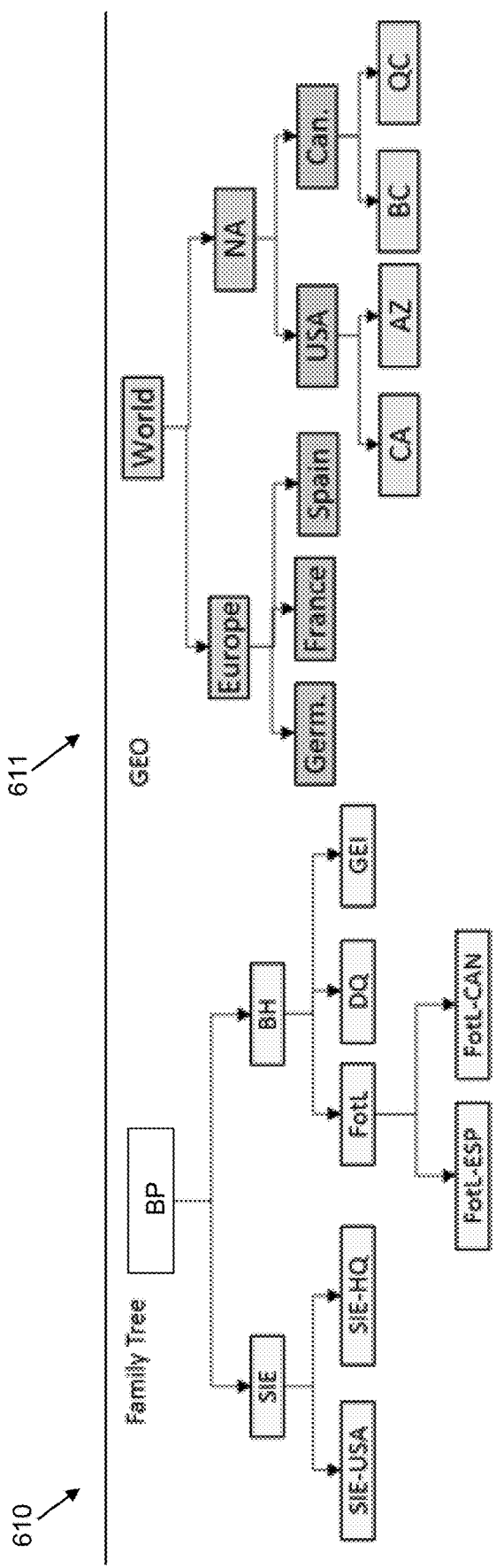
Figure 6C:
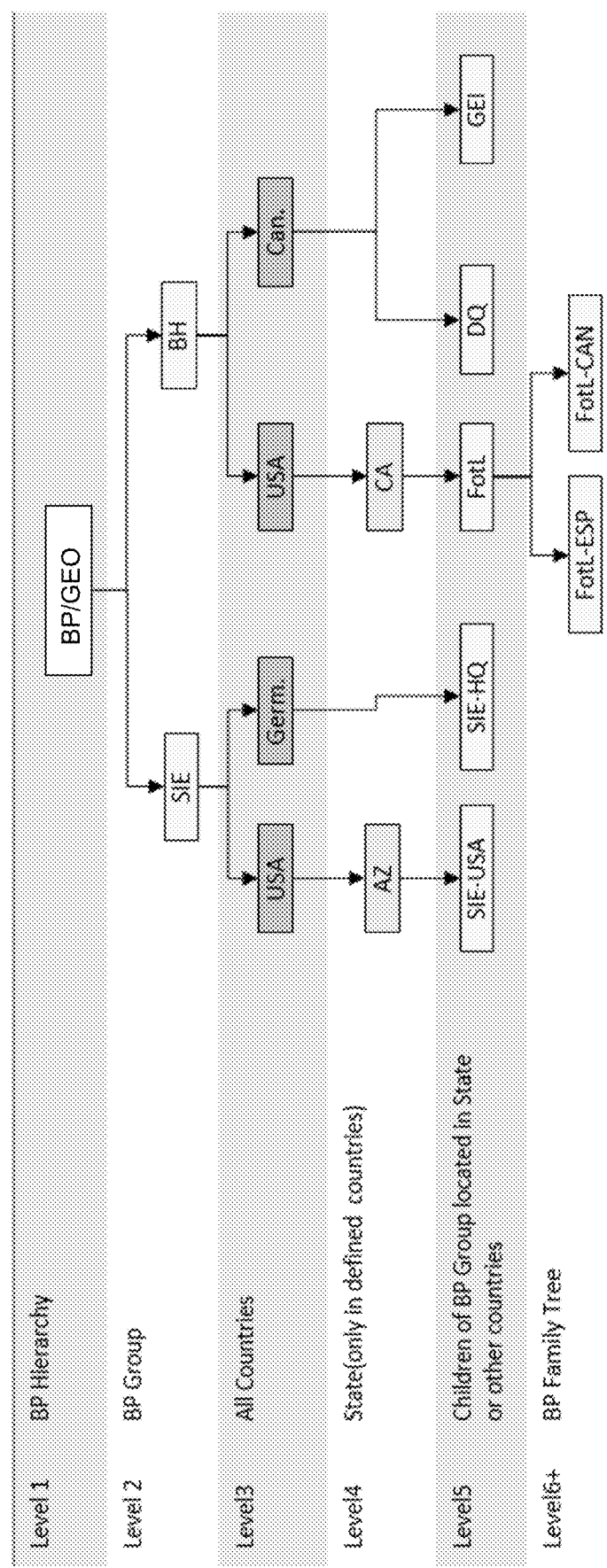

FIGS. 6A-6C illustrate a process of generating a hierarchy on a level-by-level basis in accordance with example embodiments. FIG. 6A illustrates a transformation process 600 showing an example of generating a hierarchy based on graph data. The example embodiments may receive data from one or more graphs and transform the data into a hierarchy or multiple hierarchies. In some cases, the hierarchy can be built on a level-by-level basis where all of the combined levels define the hierarchy. The transformation process 600 may include several parts, for example, a transformation definition, transformation execution (e.g., SQL statement generation and execution based on a definition for creating a dynamic result set), and a transformation conversion of the dynamic result set into nodes and links used to create the hierarchy. Each level of the transformation may include various descriptions with the transformation definition, for example, a header, a level ID and description, and one or more conditions indicating how to construct the respective level. The process may start with a single level (e.g., the top level node(s) of the hierarchy) and build the hierarchy one level of nodes at a time.

Referring to FIG. 6A, the transformation process 600 may be performed in response to receiving a request from a user, automatically, and the like. The transformation process 600 receives a transformation definition in 610. For example, the transformation definition may include information configuring each level of nodes of the hierarchy on a level-by-level basis. Each level of nodes may have one or more conditions for generating the respective level. The conditions may define node level information, node information, link information, and the like, for nodes that are included in the respective level. In FIG. 6A, the conditions are executed in 620, 621, or 622. For example, a condition group may be executed in 620 in a case where a level has more than one condition used to define the level. In this case, each condition is executed and the process 600 returns to 620 to execute the conditions until all conditions for a respective level are executed. In a case in which there is a single condition to flatten a hierarchy, operation 622 is performed. In a case in which there is a single condition for any other condition, operation 623 is performed. An output is generated in 630 in which all of the levels are combined into a hierarchy having a plurality of nodes and a plurality of links connecting the plurality of nodes in a hierarchical fashion. As a non-limiting example, the generated hierarchy may be output to a display screen, may be stored for future use, and the like.

FIGS. 6B and 6C illustrate an example of the process 600 generating a hierarchy 620 based on data graph 610 and data graph 611 (shown in FIG. 6B). In this example, the data graph 610 corresponds to business partner data and the data graph 611 corresponds to geographical data. FIG. 6C illustrates the hierarchy 620 generated on a level-by-level basis based on the data graph 610 and the data graph 611 shown in FIG. 6B. Based on transformation definitions that may be predefined for data of the type included in the data graph 610 and the data graph 611, the process 600 may build the hierarchy 620. The process 600 begins by generating level 1 nodes which in this case represents a combination of business partners and geography data. Level 2 includes business partner nodes from data graph 610. To generate level 3, process 600 determines which countries are included in the business partner data from data graph 610 and inserts nodes from data graph 611 that represent country data items. To generate level 4, the process 600 determines whether the business partners have a subsidiary that is located in a particular country (e.g., USA). If there is a subsidiary located in the particular country, a node representing the state data item in which that subsidiary is located from data graph 611 is included in level 4 of the hierarchy, otherwise, the hierarchy skips to level 5. Furthermore, the process 600 includes nodes representing all of the subsidiaries in level 5 regardless of what location they have, and determines whether to link the nodes in level 5 to the country nodes in level 3 or the state nodes in level 4 based on geographical data from data graph 611. It should be appreciated that FIGS. 6B and 6C are merely for purposes of example and are not meant to limit the scope of the example embodiments.

Figure 7A:
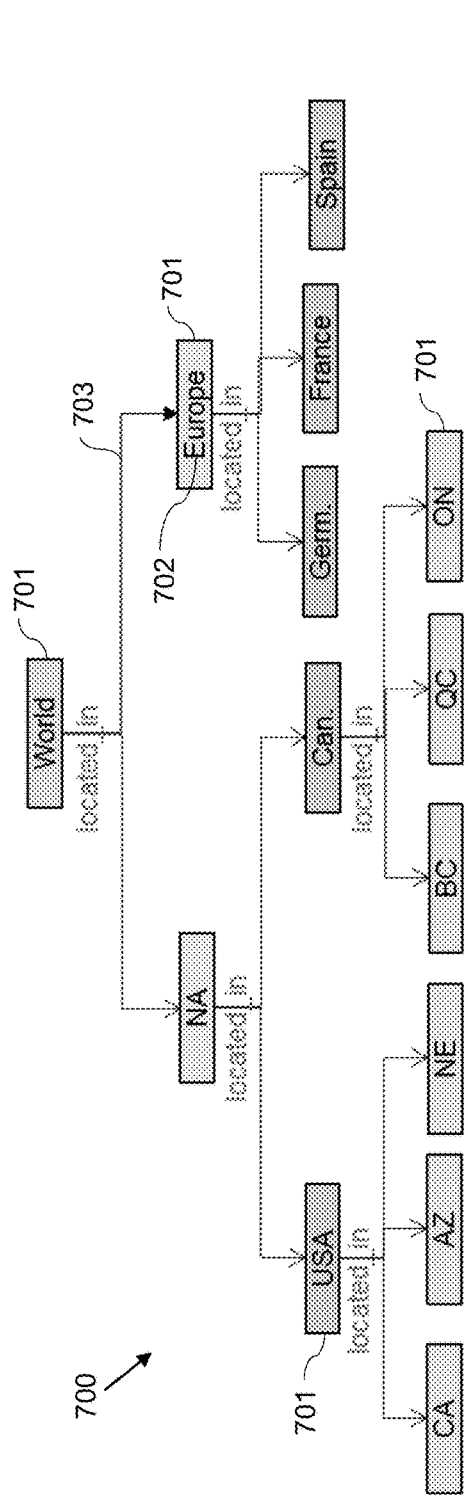
FIGS. 7A-7C are diagrams illustrating a process of generating a hierarchy by merging data from multiple data graphs in accordance with example embodiments.
Figure 7B:
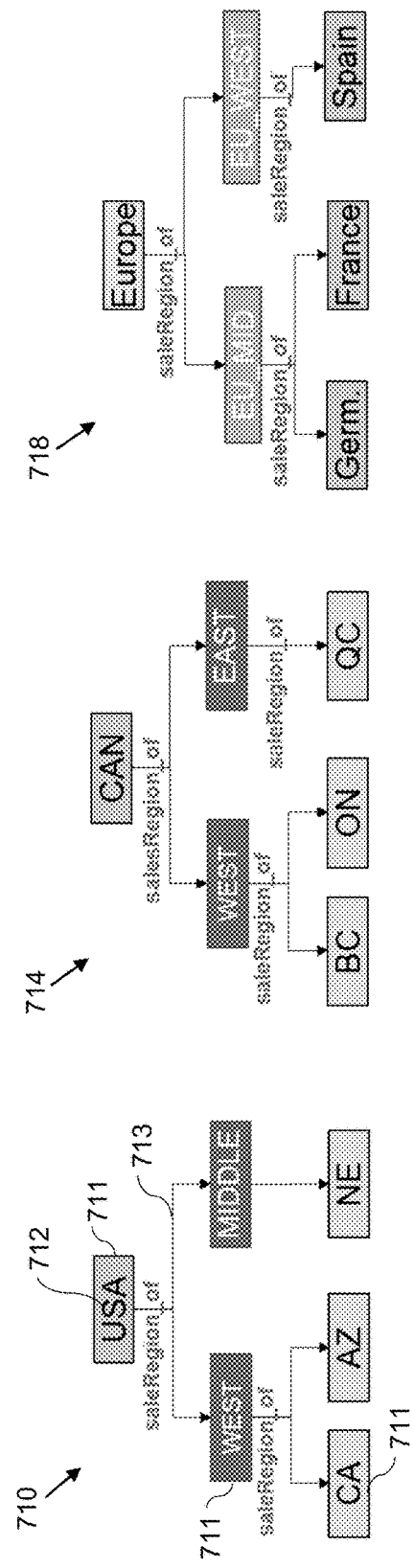
Figure 7C:
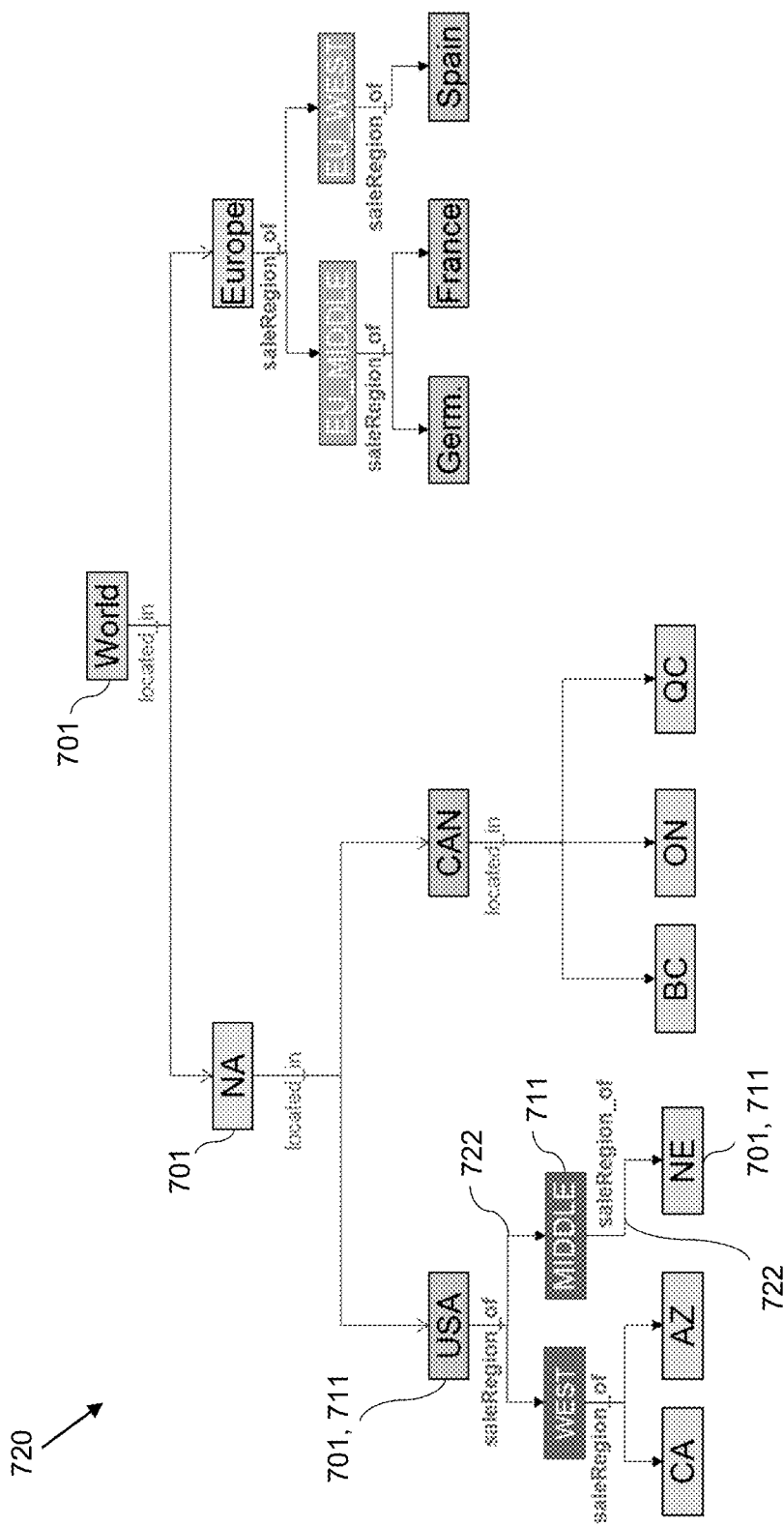

FIGS. 7A-7C illustrate generating a hierarchy 720 by merging data from multiple data graphs in accordance with example embodiments. FIG. 7A illustrates an example of a first data graph 700 having a plurality of nodes 701 each representing a plurality of data items 702, respectively, and links 703 connecting the plurality of nodes 701 with one another and indicating relationships between the plurality of first data items 702. FIG. 7B illustrates examples of data graphs 710, 714, and 718 each having a plurality of nodes representing a plurality of data items, and links connecting the plurality of nodes. For example, data graph 710 includes a second plurality of nodes 711 each representing a plurality of second data items 712, respectively, and links 713 connecting the plurality of nodes 711 with one another and indicating relationships between the plurality of second data items 712.

As an example, the data graphs 700, 710, 714, and 718 may be received by a computing device, processing component, instance, and the like, and be processed to generate hierarchy 720 shown in FIG. 7C. In this example, the hierarchy 720 may be generated based on the data graph 700 and the data graph 710, 714, and 718. As an example, the generated hierarchy 720 may include a plurality of levels. In this example, the plurality of nodes 701 from the data graph 700 may be arranged on at least one level which in this case is levels 1, 2, 3 and 5. Also, the second plurality of nodes 711 from the second data graph 710 may be arranged on at least one other level which in this case is levels 3, 4, and 5. The hierarchy 720 may also include links 722 connecting the plurality of nodes 701 from the data graph 700 and the second plurality of nodes 711 from the second data graph 710 and indicating relationships between the first data items 702 and the second data items 712. Likewise, nodes from data graphs 714 and 718 may be added to the hierarchy and be merged with the nodes 701 and the nodes 711 from the data graph 700 and the data graph 710. As shown in the examples of FIGS. 7A-7C, some of the nodes 701 and the nodes 711 from data graphs 700 and 710 may have data items that overlap with one another. In this example, data item country being USA and states being California, Arizona, and Nebraska are included in both data graphs 700 and 710. Accordingly, the nodes 700 and 710 that overlap may be merged when generating the hierarchy 720.

FIG. 8 illustrates a method 800 of generating a hierarchy in accordance with example embodiments. The method 800 may be performed by one or more computing devices, for example, a user device and a server, although, the method 800 may be performed by a single device and is not limited to being performed by multiple devices. Referring to FIG. 8, the method 800 includes receiving a first data graph comprising a plurality of nodes representing a plurality of data items, and links connecting the plurality of nodes and indicating relationships between the plurality of first data items, in 810. Furthermore, in 820, the method 800 includes receiving a second data graph comprising a second plurality of nodes representing a second plurality of data items, and links connecting the second plurality of nodes and indicating relationships between the plurality of second data items. For example, the first and second data graphs may be received by a processor, and the like. The first and second data graphs may be based on the same type of data or they may be different types of data. Also, the first and second data graphs may be in a format of a hierarchy already, or they may not be in a hierarchy format. If in a hierarchal format, the first and second data graphs do not need to include the same amount of levels. The receiving of the first data graph and the second data graph may include receiving the data graphs from a graph database or receiving relational data from a relational database and converting the relational data into the respective data graphs.

In 830, the method includes generating a hierarchy based on the first data graph and the second data graph. For example, the generated hierarchy may include a plurality of levels where the plurality of nodes from the first data graph may be arranged on at least one level and the second plurality of nodes from the second data graph may be arranged on at least one other level. The hierarchy may also include links connecting the plurality of nodes from the first data graph and the second plurality of nodes from the second data graph and indicating hierarchical relationships between the first data items and the second data items corresponding thereto. In 840, the generated hierarchy is output, for example, to an internal display, an external display, an external device, over a network, and the like. As another example, rather than outputting the hierarchy for display, the hierarchy may be stored in a storage device such as a memory, an external device, a data warehouse, and the like.

According to various example embodiments, the generating of the hierarchy in 830 may further include generating the hierarchy based on configuration information indicating how to merge the plurality of nodes from the first data graph and the second plurality of nodes from the second data graph. For example, the configuration information may include level-by-level node information and link information for merging the plurality of nodes from the first data graph and the second plurality of nodes from the second data graph. The generating the hierarchy in 830 may include merging the plurality of nodes from the first graph data with the second plurality of nodes from the second graph data, and hiding a portion of the second plurality of nodes. As an example, the generating may include extracting a level of nodes from the second plurality of nodes of the second data graph, inserting the level of nodes from the second plurality of nodes between two levels of nodes from the plurality of nodes of the first data graph, and generating links between the level of nodes from the second plurality of nodes of the second data graph and the two levels of nodes from the plurality of nodes of the first data graph. Although not shown in FIG. 8, the method may further include receiving a request for generating the hierarchy via a user interface, and the outputting in 840 may include outputting the generated hierarchy to the user interface.

Figure 9:
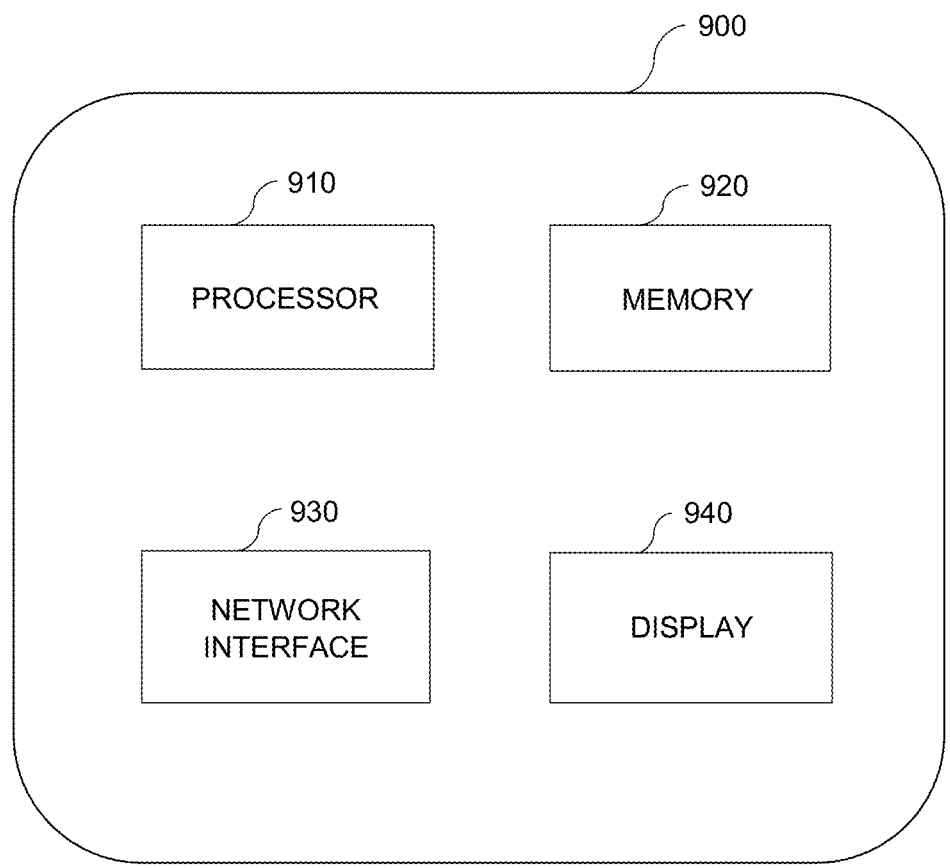
FIG. 9 is a diagram illustrating an example of a computing device for generating a hierarchy in accordance with example embodiments.

FIG. 9 illustrates an example of a computing device 900 for generating a hierarchy in accordance with example embodiments. For example, the computing device 900 may be a computer, a mobile phone, a tablet, a server, an appliance, a kiosk, and the like. The computing device 900 may perform the method of FIG. 8, and may be included in the system architecture 100 shown in FIG. 1. Referring to FIG. 9, the computing device 900 includes a processor 910, a memory 920, a network interface 930, and a display 940. Although not shown in FIG. 9, the computing device 900 may include other components such as a radio interface capable of transmitting and receiving signals via radio waves, an input unit such as a keyboard, mouse, touch screen, microphone, biometric sensor, voice and/or motion recognition module, and the like.

In this example, the processor 910 may include one or more processing devices and may control the components of the computing device 900. The memory 920 may store data, programs, and the like, and may include a hard disk, a flash drive, volatile memory, non-volatile memory, and the like, and is not limited in its design. The network interface 930 may transmit and receive data over a network such as the Internet or other network. The display 940 may display a user interface according to various example embodiments and may include any type of display. According to various aspects, the memory 920 may store instructions for performing any of the methods, operations, and processes described herein. As an example, the memory 920 may store instructions for performing the method 800 of FIG. 8. Furthermore, the processor 910 may process the instructions stored in the memory 920 for executing the methods, operations, and processes described herein such as and including the method 800 of FIG. 8.

The example embodiments describe systems and methods for generating hierarchies from graph-based data. Most hierarchies are defined as either a parent-child hierarchy or an attribute-based hierarchy. In a parent-child hierarchy, every node contains the ID of its parent node as well as the type of their relation. This is enough information to determine the exact place of every vertex in the hierarchy. In an attribute-based hierarchy, all nodes that share an attribute (e.g., cities share a country) are children of that attribute. In the attribute-based hierarchy format, every node contains information of each ancestor node it has which results in redundant information being stored. Therefore, most graph databases store graphs as parent-child hierarchies in order to conserve storage. The benefit of this type of storage is that it avoids the redundant storage of ancestor data required in the attribute-based hierarchy.

The example embodiments provide a graph extraction and manipulation language that may be used to extract graph data from a graph database. That is, using the graph extraction and manipulation language various data may be extracted and manipulated from a graph. According to various aspects, graph data may be stored as a workspace which is the equivalent of a table in a relational database. A workspace may consist of two relational database tables (vertices and edges). Examples of various fields included in a workspace table for a graph are provided below in Appendix I. According to various aspects, the graph database may also store hierarchies in an easy and logical manner. The example embodiments provide a format for describing a hierarchy. Each column of an underlying hierarchy data table may include a description of what is stands for and how it is connected to the other data. Examples fields of a hierarchy table are described in Appendix II. It should be appreciated that Appendix I and Appendix II are not meant to limit the scope of the application, and are merely here for purposes of providing a sample of various graph database information. It should also be appreciated that the examples herein may work with all kinds of graph databases and even with a rational databases were the data is stored in a graph fashion.

APPENDIX I

Workspace Table Fields

A workspace consists of two relational database tables. The Vertices table stores, as its name suggests, all vertices. It has the following fields:

URI—A unique Identifier of the vertex (primary key).

Techtype—The technical type of this record, e.g. a string or an integer.

Type—The type of a record, e.g. a person or a country. If used, no techtype needs to be specified. Instead, all records of the same type share one techtype. The type has to be defined only once.

Superterm—The superterm can be used to show inheritance of types. This field is not mandatory and if no superterm is specified, the graph engine will automatically choose one depending on the type.

Name—A (human-readable) name of this vertex.

Description—A description of the Vertex.

Custom Attributes—E.g. the height or the age of a person, the size of a country.

The Edges Table stores relationships between vertices. It has the following fields:

Source—The URI of the first vertex.

Target—The URI of the second vertex.

Type—The type of the relationship e.g. source is the parent of the target or source is a city in the target.

APPENDIX II

Hierarchy Table Fields

Supports Attributes—Every vertex can have many attributes.

Multiple Hierarchy Levels—Not every entry is defined just by its parent. Some hierarchies have multiple parents or the parent of the parent is defined in the current record.

Error correcting—If any ancestors vertices are missing, they should be created on the fly. This is always the case in attribute-based hierarchies.

Fast—Iterating over data is slow and cannot be parallelized. To maximize performance, only SQL statements which affect the whole table are allowed.

Multiple Hierarchies—A record can be part of multiple hierarchies e.g. a person can have parents and grandparents as well as a city, a state and a country he or she lives in.

Scriptable—The data in a column does not always match what we need for a hierarchy. Automatic data transformation via SQL function must be possible.

Linking to other hierarchies—Vertices can link to vertices on other hierarchies, e.g. a person in a genealogy can live in a city from a regional hierarchy.

Linking to master data—Not all data will be available in the graph. For further information, a link to appropriate master data record must be set.

The hierarchy definition by itself is a table. It can be created as a CSV-File and imported to a graph database. Every row in the definition file refers to a column in the data file. It explains what this means and how it is to be imported into the hierarchy. The definition file has the following columns:

NAME—is the name of the column in the data file this line of the definition refers to. So each line of the definition explains the content of a column of the data file.

TYPE—A column can be an attribute, an ID or a foreign key (foreign keys refers to another hierarchy). ID are unique values that refer either to the current master data or to an ancestor of it.

EDGE—For ID values: specifies the type of all incoming edges to this record. For attributes: specifies the name of the attribute (with this, attributes can be renamed during import).

TO: Only for attributes: specifies to which ID entry this attribute belongs. Since one master data record can create more than one vertex (it also creates parents), this specifies which vertex the attribute refers to. If the cell is left empty, the attribute may refer to ALL vertices created out if this master data record.

LEVEL—Only for ID values: Is this a parent of the current attribute, or the parent of the parent etc. Parent level 0 is for the current record, 1 for the parent etc.

HIERARCHY—Only for ID values: If multiple hierarchies (e.g. a regional and a genealogy) are in one dataset, they can be separated with this attribute. Just specify any name and all entries with type ID sharing a name will be put together to a hierarchy.

PREFIX—Only for ID values: give your hierarchy (or hierarchy level) a unique name. All entries will be prefixed with this value. This will avoid name clashes with other hierarchies.

SQL—In some cases, the data is not in the exact format needed. So it is possible to specify a custom SQL expression that will be used instead of the real values.

COMMENT—Comments are not mandatory, but will help the next person reading the definition to understand it.

Foreign keys are defined like attributes except that they need a prefix, which specifies the foreign hierarchy they are linking to.

According to various example embodiments, graph data may be used to generate analytical hierarchies. In the examples herein, analytical hierarchies are described as being generated based on a first data graph and a second data graph for purposes of convenience. However, it should be appreciated that a hierarchy may be generated using any number of data graphs. For example, the hierarchy may be generated using a graph, two graphs, three graphs, or more graphs. Also, the first data graph and the second data graph may be separate graphs related to separate data. As another example, the first data graph and the second data graph may be different portions of a same graph. For example, the first data graph may be a first section of a graph, hierarchy, taxonomy, or the like, and the second data graph may be a second section from the same graph, hierarchy, taxonomy, or the like. It should also be appreciated that data included in the first data graph may overlap or partially overlap with data included in the second data graph, regardless of whether the first data graph and the second data graph are from the same graph or from different graphs. Therefore, the examples herein are not limited to the amount of graphs that may be used to generate a hierarchy nor are they limited to the described data types.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/ machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the invention as set forth in the appended claims.

What is claimed is:

1. A system comprising:
   at least one processor; and
   a memory storing instructions that, when executed by the at least one processor, cause the system to perform operations comprising:
      generating a view of a first data graph comprising a first plurality of nodes that correspond to a plurality of first data items, and links connecting the first plurality of nodes and indicating a hierarchy among the plurality of first data items;
      generating a view of a second data graph comprising a second plurality of nodes that correspond to a second plurality of data items, and links connecting the second plurality of nodes and indicating a hierarchy among the plurality of second data items;
      identifying a database table storing hierarchical relationships between the plurality of first data items and the plurality of second data items;
      merging at least a portion of the view of the first data graph and at least a portion of the view of the second data graph on a screen to generate a merged hierarchy graph, the merging comprising deleting direct links between nodes in two existing levels of the hierarchy among the plurality of second data items, extracting multiple nodes from a same level of the first data graph, creating indirect links between the nodes in the two existing levels by inserting the multiple extracted nodes at a new intermediate level between the two existing levels of the second data graph and connecting the multiple extracted nodes to the respective nodes in the two existing levels of the second data graph via links based on an intermediate hierarchical relationship read from the identified database table which identifies a hierarchy between first data items corresponding to the multiple extracted nodes from the first data graph and second data items corresponding to the nodes from the two existing levels of the second data graph; and
      outputting the merged hierarchy graph to the screen.

2. The system of claim 1, wherein the merging further comprises merging the views of the first and second data graphs based on configuration information read from the identified database table indicating how to merge the first plurality of nodes from the first data graph and the second plurality of nodes from the second data graph.

3. The system of claim 2, wherein the configuration information comprises level-by-level node information and link information for merging the first plurality of nodes from the first data graph and the second plurality of nodes from the second data graph.

4. The system of claim 1, wherein the generating the view of the first data graph comprises at least one of receiving the first data graph from a graph database and receiving relational data from a relational database and converting the relational data into the first data graph.

5. The system of claim 1, wherein the merging further comprises hiding one or more of a view of a portion of the first data graph and a view of a portion of the second data graph.

6. The system of claim 1, wherein the first data graph and the second data graph each comprise a hierarchical format having multiple levels.

7. The system of claim 1, wherein at least one of the plurality of first data items comprise geographical data items and at least one of the second plurality of data items comprise geographical data items.

8. The system of claim 1, further comprising receiving a request for generating the merged hierarchy graph via a user interface, and the outputting comprises outputting the generated merged hierarchy graph to the user interface.

9. The system of claim 1, wherein the merging comprises interconnecting a first level of the nodes from the second data graph to the extracted level of nodes from the first data graph and interconnecting the extracted level of nodes from the first data graph to a second level of nodes from the second data graph.

10. A method of generating a hierarchy, comprising:
generating a view of a first data graph comprising a first plurality of nodes that correspond to a plurality of first data items, and links connecting the first plurality of nodes and indicating a hierarchy among the plurality of first data items;
generating a view of a second data graph comprising a second plurality of nodes that correspond to a second plurality of data items, and links connecting the second plurality of nodes and indicating a hierarchy among the plurality of second data items;
identifying a database table storing hierarchical relationships between the plurality of first data items and the plurality of second data items;
merging at least a portion of the view of the first data graph and at least a portion of the view of the second data graph on a screen to generate a merged hierarchy graph, the merging comprising deleting direct links between nodes in two existing levels of the hierarchy among the plurality of second data items, extracting multiple nodes from a same level of the first data graph, creating indirect links between the nodes in the two existing levels by inserting the multiple extracted nodes at a new intermediate level between the two existing levels of the second data graph and connecting the multiple extracted nodes to the respective nodes in the two existing levels of the second data graph via links based on an intermediate hierarchical relationship read from the identified database table which identifies a hierarchy between first data items corresponding to the multiple extracted nodes from the first data graph and second data items corresponding to the nodes from the two existing levels of the second data graph; and
outputting the merged hierarchy graph to the screen.

11. The method of claim 10, wherein the merging further comprises merging the views of the first and second data graphs based on configuration information read from the identified database table indicating how to merge the first plurality of nodes from the first data graph and the second plurality of nodes from the second data graph.

12. The method of claim 11, wherein the configuration information comprises level-by-level node information and link information for merging the first plurality of nodes from the first data graph and the second plurality of nodes from the second data graph.

13. The method of claim 10, wherein the generating the view of the first data graph comprises at least one of receiving the first data graph from a graph database and receiving relational data from a relational database and converting the relational data into the first data graph.

14. The method of claim 10, wherein the merging further comprises hiding one or more of a view of a portion of the first data graph and a view of a portion of the second data graph.

15. The method of claim 10, wherein the first data graph and the second data graph each comprise a hierarchical format having multiple levels.

16. The method of claim 10, wherein at least one of the plurality of first data items comprise geographical data items and at least one of the second plurality of data items comprise geographical data items.

17. The method of claim 10, further comprising receiving a request for generating the merged hierarchy graph via a user interface, and the outputting comprises outputting the generated merged hierarchy graph to the user interface.

18. A non-transitory computer readable medium having stored therein instructions that when executed cause a computer to perform a method of generating a hierarchy, the method comprising:
generating a view of a first data graph comprising a first plurality of nodes that correspond to a plurality of first data items, and links connecting the first plurality of nodes and indicating a hierarchy among the plurality of first data items;
generating a view of a second data graph comprising a second plurality of nodes that correspond to a second plurality of data items, and links connecting the second plurality of nodes and indicating a hierarchy among the plurality of second data items;
identifying a database table storing hierarchical relationships between the plurality of first data items and the plurality of second data items;
merging at least a portion of the view of the first data graph and at least a portion of the view of the second data graph on a screen to generate a merged hierarchy graph, the merging comprising deleting direct links between nodes in two existing levels of the hierarchy among the plurality of second data items, extracting multiple nodes from a same level of the first data graph, creating indirect links between the nodes in the two existing levels by inserting the multiple extracted nodes at a new intermediate level between the two existing levels of the second data graph and connecting the multiple extracted nodes to the respective nodes in the two existing levels of the second data graph via links based on an intermediate hierarchical relationship read from the identified database table which identifies a hierarchy between first data items corresponding to the multiple extracted nodes from the first data graph and second data items corresponding to the nodes from the two existing levels of the second data graph; and
outputting the merged hierarchy graph to the screen.

19. The non-transitory computer readable medium of claim 18, wherein the merging further comprises merging the views of the first and second data graphs based on configuration information read from the identified database table indicating how to merge the plurality of nodes from the first data graph and the second plurality of nodes from the second data graph.

* * * * *